May 28, 1963 P. H. CLEFF 3,091,059
MEANS FOR GENERATING INVOLUTE GEARS
Filed Sept. 20, 1960 4 Sheets-Sheet 3

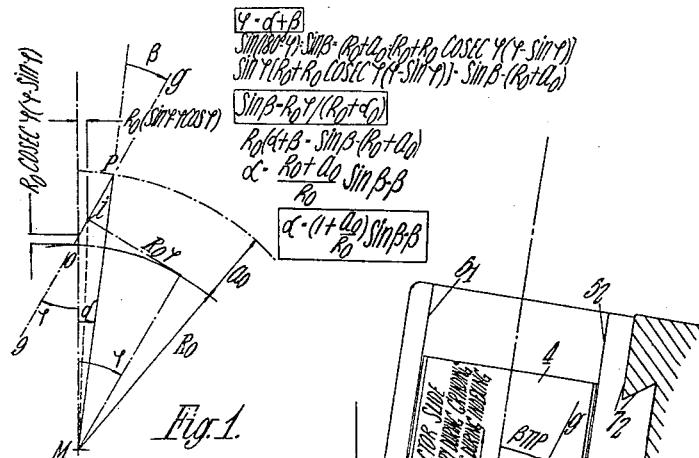

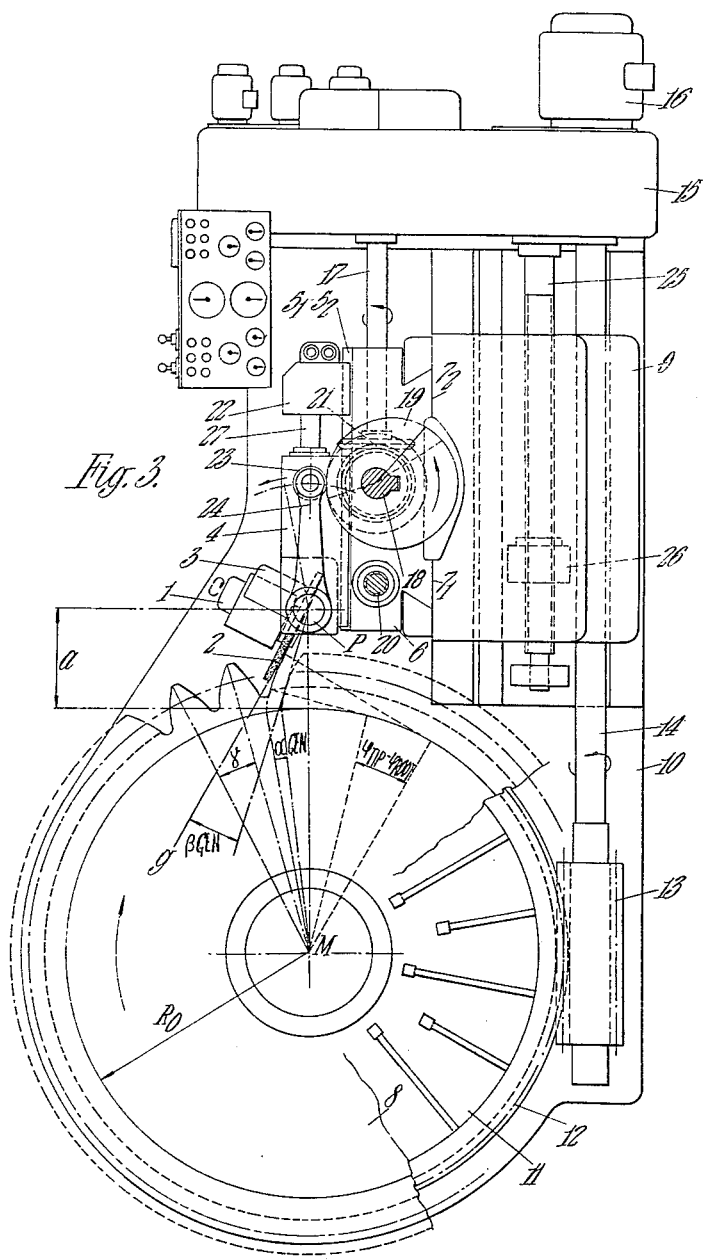

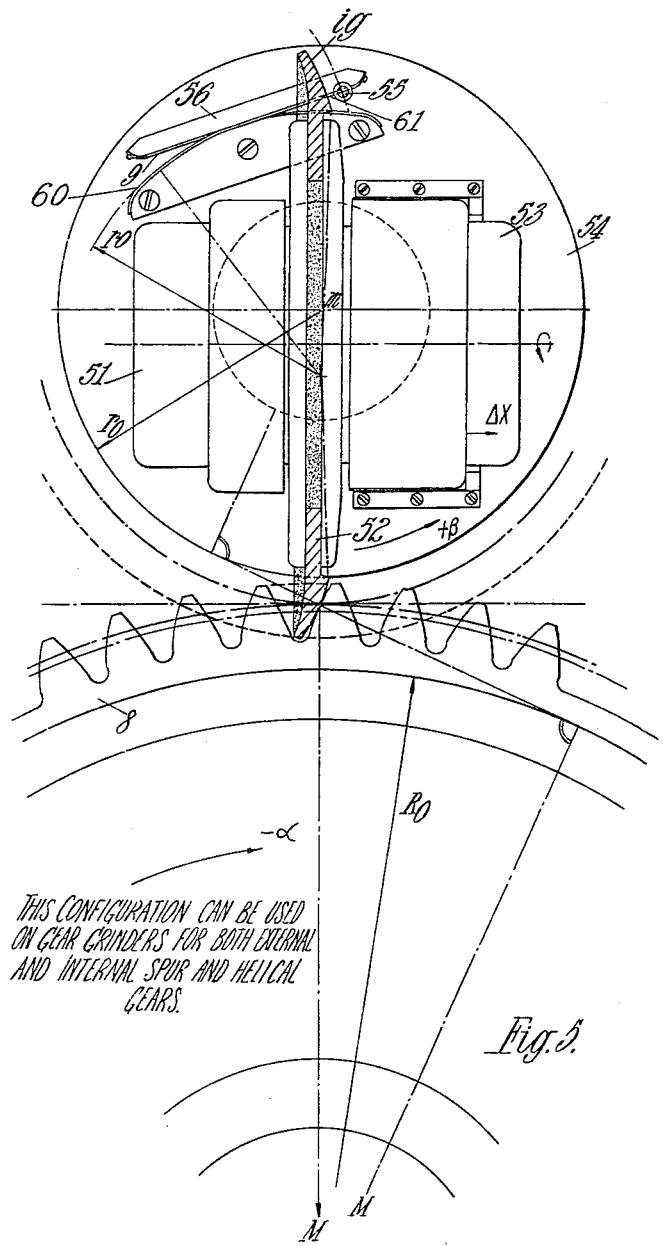

United States Patent Office 3,091,059
Patented May 28, 1963

3,091,059
MEANS FOR GENERATING INVOLUTE GEARS
Peter H. Cleff, Newcastle-upon-Tyne, England, assignor to The Parsons and Marine Engineering Turbine Research and Development Association, Wallsend, England
Filed Sept. 20, 1960, Ser. No. 57,244
Claims priority, application Great Britain Oct. 9, 1959
7 Claims. (Cl. 51—32)

This invention relates to means for generating involute gears. Its principal object is to provide, in connection with the manufacture of high precision involute spur or helical gears, improved means whereby the gear tooth flanks, having been pre-cut by one of the well known machining processes such as hobbing or planing, may be finished to a high degree of accuracy in the desired profile by a profile generating process employing a rotatably driven generating wheel, hereinafter referred to as a grinding wheel.

In the generating process in accordance with the present invention, the grinding wheel is guided with an oscillating motion over a distance sufficient to cover the depth of tooth required, basically in such a way that the operative face generatrix of said grinding wheel envelopes, as a line curve, a true circular involute developed from the gear base circle of radius $R_0$, or a high order approximation thereto, during either the inward or outward half of its cycle of movement—whilst the gear being ground is rotated at a constant angular velocity. Means may also be provided for modifying the generative path of the wheel so that simultaneously with the basic curve, the grinding wheel produces tooth profile modifications such as tip and/or root relief.

A flat sided grinding wheel with line contact between the tooth flank being ground and said wheel may be used when producing a tooth profile without any profile modifications since there is then no risk of damaging the previously ground portions of the tooth flank due to said line contact. For producing a modified profile, i.e. one having either tip and/or root relief, a cone-shaped wheel making point contact with the flank of a work piece tooth is preferred in order to eliminate this risk. One embodiment of the invention will be particularly described hereinafter with reference to such a cone-shaped wheel because of its greater utility. However, the wheel may, as another alternative have an involute shape.

It will be clear that in order to grind over the whole flank of a spur or helical gear tooth and repeat the operation on successive teeth of the work piece, further correlated movements must be imparted to the grinding wheel and/or the work piece. One object of the present invention is to provide an improved gear generating machine in which all the required operative movements, i.e. cutting, generation of profile and helix, indexing from tooth to tooth, and feed across the face of the gear being ground, are imparted to the grinding wheel while the work piece (a pinion or gear wheel suitably pre-cut and heat-treated) rotates continuously at a constant angular velocity.

Essential parts of such a machine provided by the invention are a grinding head incorporating the grinding wheel and its associated guiding mechanism and complying with the requirement that all the components of the said grinding head—except the operative part of the generating wheel—must be located and must operate entirely outside the space occupied by the work piece, a rotatably mounted work table driven at constant angular velocity, and a correlator mechanism establishing and maintaining correctly timed relations between the constant angular velocity rotation of the work table and the cyclic profile generating and indexing movements of the grinding head. The remaining parts of the machine, e.g. main bed, column, feed slide, etc., may be constructed according to known practice in the art.

The invention consists in a machine for generating involute gears using a continuously rotating work-table, and comprising a rotatable spindle adapted to carry a generating wheel, e.g. a grinding wheel having a flat or cone-shaped operative face mounted in a spindle-holding member and angularly movable therewith about a main pivot axially normal to and co-planar with the generatrix of the generating wheel and also parallel to the work piece axis, said pivot being journalled in a main slide and slidable therewith in rectilinear guides so positioned that its rectilinear path coincides with a radial line through the work piece centre, a retractor mechanism actuating said main slide in such a way that during grinding the main pivot lies at the datum distance "$R_0+a_0$" from the gear axis but is withdrawn for indexing to a distance "$R_0+a_0+$Tooth Height" from said axis and means for correlating the angular movements of the work piece and spindle holding member plus the rectilinear movement of the main slide in such timed relation that from the said datum position and during the generating period of the mechanism with respect to one tooth flank of the work piece, an angular movement $-\alpha_{\text{GEN}}(\alpha_{\text{GEN}}=\alpha_{\text{GENERATING}})$ of the work table is accompanied by an angular movement $+\beta_{\text{GEN}}$ of the spindle holding member such that $\alpha_{\text{GEN}}=[(1+a_0/R_0)\sin\beta_{\text{GEN}}-\beta_{\text{GEN}}]$, and that from the end of said generating period a further angular movement of the work table through $-\alpha_{\text{INDEXING}}$ is accompanied by a rectilinear movement of the main pivot, to a distance "$R_0+a_0+$Tooth Height" from the gear axis, an angular rotation $-\beta_{\text{GEN}}$ of the spindle-holding member and a rectilinear return movement of the main slide, and hence main pivot, to its datum position "$R_0+a_0$" distance from the gear axis, said datum position now being with respect to another gear tooth flank either several pitches or, preferably, one pitch away from the first flank referred to above.

In order that the invention may be more fully understood, it will now be briefly described, by way of example, with reference to the accompanying diagrammatic drawings.

FIGURE 1 illustrates the basic kinematic principles underlying the invention, and their mathematical representation.

FIGURE 2 is a plan view of the essential components required for a gear grinding machine in accordance with the invention.

Figure 4:
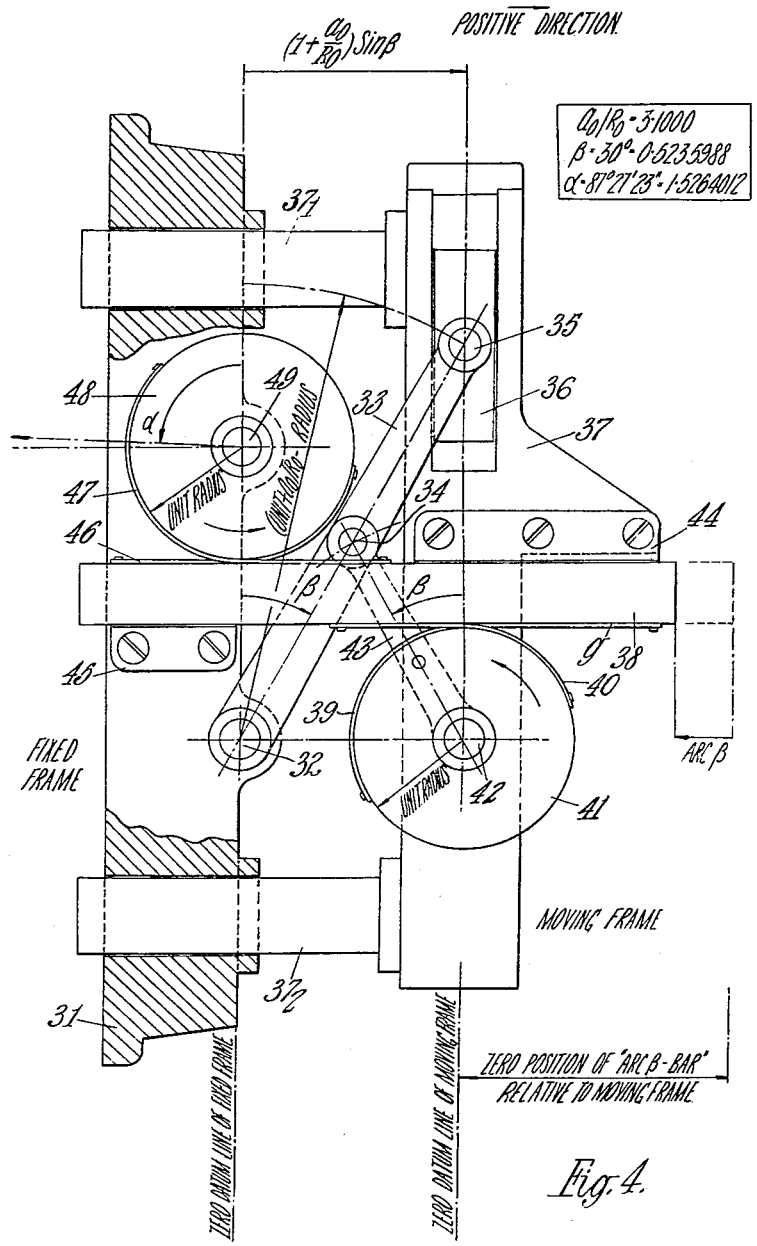

FIGURE 3 gives the plan view of a particular complete gear grinding machine in accordance with the invention.

FIGURE 4 illustrates the basic kinematic principles of a cam generating mechanism for the manufacture of cam profiles required for involute generation in a gear grinding machine according to the present invention.

FIGURE 5 shows another possible form of a generative gear grinder with continuous rotary motion of the workpiece in accordance with the invention.

FIGURE 1 illustrates the basic kinematic principle of the invention and gives the mathematic relationship between involute angle $\phi$ (phi), angle of work table rotation $\alpha$ and angle of spindle-holding member rotation $\beta$ in the form of three simple equations. It will be seen that if the line MP of length "$R_0+a_0$" is rotated round M through an angle $-\alpha$ the generatrix line Pg pivoted to MP at P must be rotated through an angle $-\beta$ relative to PM in order to remain tangent to an involute $i$ developed from a base circle of radius $R_0$. Conversely, if now the line MP is held stationary and base circle plus involute $i$ are rotated about M through an angle $+\alpha$ (in an anti-clockwise direction) it will be clear from the foregoing that line $Pg$ must again be rotated through an angle $-\beta$ (in a clockwise direction about $P$ relative to $PM$) maintain tangential contact between involute $i$ and generatrix $Pg$ in compliance with the basic equation $\alpha = [(1+a_0/R_0) \sin \beta - \beta]$.

FIGURE 2 shows more clearly the significance of, and relation between, involute angle $\phi$ in the form of $\phi_{TIP}$ and $\phi_{ROOT}$, pressure angle $\varphi$, number of teeth N in gear to be ground, pitch angle $\gamma$ (gamma), base circle radius $R_0$, datum distance $R_0+a_0$, angle of table rotation $$\alpha_{GEN} + \alpha_{INDEXING}$$

and angle of spindle-holding member rotation $$\beta_{GEN} = \beta_{TIP} - \beta_{ROOT}$$

FIGURES 2 and 3 (of which the latter gives a plan view of one possible configuration of a complete machine constructed in accordance with the invention) show a rotatable spindle head 1, carrying a grinding wheel 2 having a straight cone-shaped operative face with an apex angle of between 150° to 179°, as being mounted in a spindle holding member 3 and being angularly movable therewith about a main pivot P axially normal to and co-planar with the generatrix "$gg$" of the operative face of the grinding wheel and also parallel to the axis M of a work piece 8. The main pivot P is journalled in a main slide 4 rectilinearly movable in guide ways $5_1$—$5_2$ on a feed slide 6 which latter can be moved in a direction parallel to the axis of the work piece along guide ways $7_1$—$7_2$ on column 9 to give to the grinding wheel 2 a feed motion across the face of the gear being ground. The position of guide ways $5_1$—$5_2$ relative to the work piece is such that movement of the main slide 4 causes the main pivot P to move along a rectilinear path which, when produced, passes through the centre M of said work piece.

As regards the operation of a machine constructed in accordance with the invention, it will be readily understood that the number of complete operational cycles to be performed by the grinding head mechanism per revolution of the work piece must be equal to the number of teeth N in said work piece. Each cycle consists of two distinct stages, i.e.

Generating during which grinding takes place on one tooth flank, and

Indexing during which the grinding head mechanism first retracts and then returns the grinding wheel to its initial (datum) position while the work piece is indexed by one tooth pitch.

Both these stages follow each other in uninterrupted sequence, as do the complete cycles, and are carried out with the work piece being continuously rotated at constant angular velocity, and in timed relation thereto. Hence it follows that the total time available per grinding head cycle is equal to $1/N$ of the time taken by one revolution of the work, or, expressing this in terms of angle of table rotation and pitch angle, that the relation $\alpha_{GEN} + \alpha_{INDEX} = \gamma$ must always hold.

With these points in mind, the basic operational principle of a gear generating machine in accordance with the invention can now be described.

Taking the relative positions of grinding wheel 2 and work piece 8 shown in FIGURE 2 as the datum, it will be seen that main pivot P lies on a radial line through centre M of work piece 8, a distance "$R_0+a_0$" away from said centre. Grinding wheel 2 contacts the left-hand flank of tooth "A" at its tip "T" and main slide 4 is held stationary. Simultaneous rotation of work piece 8 through angle $-\alpha_{GEN}$ and of grinding wheel 2 through angle $+\beta_{GEN}$ about main pivot P, such that $$\alpha_{GEN} = [(1+a_0/R_{0GEN}) \sin \beta_{GEN} - \beta_{GEN}]$$

will then result in the grinding wheel generatrix "$gg$" sweeping out an involute $i$ from the base circle $R_0$. As soon as the point of contact between grinding wheel and tooth being ground, has passed the root point "R" of involute $i$ (as the result of the simultaneous angular movements $-\alpha_{GEN}$ and $+\beta_{GEN}$ just referred to) main slide 4 starts retracting outwards by an amount sufficient to allow the grinding wheel 2 to clear the tip circle of the work piece when its angular motion about main pivot P is reversed for its return to the initial datum position. This reversal of angular movement of grinding wheel 2, the return of main pivot P (in main slide 4) to its "$R_0+a_0$" datum position and the re-start of the angular generating motion $+\beta_{GEN}$ of the grinding wheel, are all carried out in such timed relation with the work piece rotation that they are completed on, and are coincident with the arrival of the left-hand flank of tooth "B" in exactly the same datum position as that previously occupied by the homologous flank of tooth "A", now one tooth pitch (angle $\gamma$) away.

Referring to FIGURES 2 and 3 a main bed 10 forms the basis of the machine. Rotatably mounted in said bed is a table 11 carrying a work piece 8 and having attached to it a master worm wheel 12 driven at a uniform rate by a master worm 13 through shaft 14 from a main motor 16. Bed 10 also carries a column 9 whose distance from table centre M can be adjusted by means of a traversing screw 25 and a nut 26. The column 9 supports a feed slide 6 which can be moved along said column by a lead screw 20 driven from the worm shaft 14 through change gears in gear box 15. On the feed slide are mounted (a) a cam shaft 18 carrying a master cam 19 both driven from the worm shaft 14 by means of bevel gears 21 and a shaft 17 through a second set of change gears in the gear box 15 (b) the main slide 4 slidable on rectilinear guide ways $5_1$—$5_2$; and (c) a hydraulically operated main slide retractor unit 22 which actuates said main slide through piston rod 27 in timed relation with the rotation of cam shaft 18.

The main slide 4 carries the spindle holding member 3—3 to which are attached the spindle 1 with grinding wheel 2—in which the whole unit 3+1+2 can be angularly rotated by means of a lever 24 rigidly attached to said pivot and contacting master cam 19 with roller 23 (mounted at the free end of said lever) under acceleration-controlled hydraulic pressure.

The cam shaft 18 must be run at N times the speed of the table 11 if N is the number of teeth in the work piece 8, and the cam profile 19 must be produced on the basis of this speed ratio N and in accordance with the basic equation $\alpha = [(1+a_0/R_0) \sin \beta - \beta]$, having due regard to the magnitude of the angles $\alpha_{GEN}$, $\alpha_{INDEXING}$ and $\gamma$.

In order to facilitate the manufacture of cams 18, mechanism shown by way of example in FIGURE 4 may be utilized in a known manner on a cam-milling or grinding machine. The mechanism generates the basic function $\alpha = (1+a_0/R_0) \sin \beta - \beta$ in a form most suitable for such application in that both input $\alpha$ and output $\beta$ are produced as shaft rotations relative to a common fixed frame.

In its simplest form this function generating mechanism is based on a fixed frame 31 and comprises, in addition to said frame, a lever 33 pivotally connected to frame 31 by means of a pivot 32, a circular disc 48 of unit radius rotatably held on frame 31 by means of a pivot 49, a moving frame 37 slidably mounted in the frame 31 and constrained to move parallel thereto by means of guide bars $37_1$ and $37_2$, a second circular disc 41 also of unit radius but rotatably mounted on a moving frame 37 by means of a pivot 42, a lever 43 integral with the circular disc 41 and pivotally connected at its other end to the lever 33 by means of pivot 34 such that respective rectilinear distances from pivot 42 to pivot 34 and from pivot 32 to pivot 34 are both equal to $\frac{1}{2}(1+a_0/R_0)$, a sliding block 36 engaging a vertical slot in moving frame 37 and pivotally connected by pivot 35 to the free end of the lever 33 which pivot is distant $(1+a_0/R_0)$ away from pivot 32 and finally a slidable straight edge 38 constrained to move in a path parallel to that of frame 37 relative to fixed frame 31 by means of guide 45 on frame 31 and 44 on frame 37 and kept in zero-slip drive connection with circular discs 48 and 41 on opposite sides of said discs by means of two pairs of pre-tensioned steel tapes 46/47 and 39/40 respectively.

Operation of the mechanism will best be understood by taking angle B as input and angle L as output and not in the reversed order of the normal application when L=input and B=output. A rotation of lever 33 in a clockwise direction through —B will move frame 37 to the right by an amount $(1+a_0/R_0)$ sin B. Due to the equality distance 32 to 34=distance 34 to 42, the circular disc 41 will be rotated simultaneously through +B relative to frame 37 and by means of steel tapes 39 and 40 cause straight edge 38 to move to the left relative to frame 37 by an amount arc B. The absolute movement of straight edge 38 relative to fixed frame 31 will then be $(1+a_0/R_0)$ sin B—arc B and equal to arc L. Transformation of arc L into L degrees or shaft rotation is effected by the steel tape drive 46/47 between straight edge 38 and circular disc 48 of unit radius.

It is, of course, possible to replace cam 19 by an adjustable curve generating mechanism, using a method similar to that outlined in my application Serial No. 55,321, filed September 12, 1960, now Patent No. 3,060,642, dated October 30, 1962, and covering the whole operative range of any one machine. Generally speaking, any type of link-mechanism, link-plus-cam mechanism or link-plus-roll-curve mechanism may be used provided it gives the required relationship between $\alpha_{GEN}$, $\beta_{GEN}$, $\alpha_{INDEXING}$ and $\gamma$ with the necessary accuracy and is sufficiently simple to adjust for different sizes of work gear.

An arrangement shown in FIGURE 5 may also be used for a continuously indexing gear generating machine, particularly when such machine is also intended for the grinding of internal spur or helical gears—from about 15 inch pitch circle diameter upwards.

This arrangement embodies a grinding wheel 52 shaped to an involute ig from a base circle $r_0$ which is rotatably mounted in bearings 51 and 53 on a carrier 54, and is rotated about the axis m of said carrier in mesh with a work gear 8 and in correctly timed relation with the rotation of said work gear round its axis M.

This method may be used either at constant centre distance mM, when after grinding on one work gear tooth a considerable number of such work gear teeth have to be passed over before the grinding wheel can again come into engagement, or it may be used in conjunction with a machine arrangement similar to that described with reference to FIGURES 2 and 3 when only one or two teeth have to be passed over.

The grinding wheel form and its position relative to the axis m of the carrier 54 are under constant control of a diamond dresser unit 55, 56, 57, 59, 60 and 61, mounted on the carrier 54 and actuated by a roll type involute generator with base circle $r_0$.

An axial spindle movement $\Delta x$ of, say 0.0001 to 0.0002 inch—depending on wheel wear rate per cycle—when the grinding wheel is out of mesh with the work gear, followed by a wheel dressing cycle, maintains tooth to tooth accuracy on the work piece both regard to pitch and profile.

The law governing the generating process in this type of machine can be simply expressed as $\beta$=constant $.\alpha$.

I claim:

1. A machine for generating involute gear teeth on a work-piece, comprising a work-table adapted to carry said work-piece and mounted for continuous rotation about an axis, means for rotating said work-table continuously about said axis, a grinding wheel having an operative face defining a generatrix, a rotatable spindle carrying said grinding wheel, a spindle-holding member angularly movable about a main pivot axis normal to said generatrix and parallel to said work-table axis, a main slide slidable in a rectilinear path, rectilinear guides guiding said main slide with said rectilinear path coinciding with a radial line through said work-table axis, said spindle-holding member being journalled in said main slide, a retractor mechanism actuating said main slide, and means for corelating the angular movement of said work-table and said spindle-holding member plus the rectilinear movement of said main slide during the generation of one flank of a gear tooth, according to a relationship $$\alpha_{GEN}=[(1+a_0/R_0)] \sin \beta_{GEN}-\beta_{GEN}$$

wherein $R_0$ is the base circle radius of said gear teeth, $a_0$ is the distance of a datum position of said main pivot axis from said base circle, $-\alpha_{GEN}$ is the angular movement of said work-table in generating one flank of one gear tooth, and $+\beta_{GEN}$ is the corresponding angular movement of said spindle-holding member, and during indexing, for withdrawing said main pivot axis to a distance of $R_0+a_0$ plus the radial height of a gear tooth, from said work-table axis, for rotating said spindle-holding member through an angle $-\beta_{GEN}$, and returning said main pivot axis to said datum position, whilst said work-table rotates to bring another tooth flank into generating relationship with said operative face of the grinding wheel.

2. A machine as claimed in claim 1 comprising a feed slide carrying a cam shaft, a master cam mounted on said cam shaft, a lever connected to said spindle-holding member, said lever having an end portion engaging said master cam, and means for rotating said cam shaft in timed relation with said work-table and with said retractor mechanism, said means for rotating said work-table being for rotating said work-table at a uniform rate.

3. A machine as claimed in claim 1 comprising a feed slide carrying a drive shaft, a link mechanism driven by said drive shaft, a lever connected to said spindle-holding member, said lever having an end portion engaging an output member of said link mechanism, and means for rotating said drive shaft in timed relation with said work-table and with said retractor mechanism, said means for rotating said work-table being for rotating said work-table at a uniform rate.

4. A machine as claimed in claim 1 wherein said generatrix is a straight line and wherein said main pivot axis is co-planar with said generatrix.

5. A machine as claimed in claim 1 wherein said corelating means is for effecting one cycle of operation whilst said work-table rotates through an angle corresponding to one tooth pitch.

6. A machine as claimed in claim 1 wherein said generatrix is involute shaped and wherein $$\beta_{GEN}=\text{constant} \times \alpha_{GEN}$$

7. A machine for generating involute gear teeth on a work-piece, comprising a work-table adapted to carry said work-piece and mounted for continuous rotation about an axis, means for rotating said work-table about said axis, a grinding wheel having an operative face defining an involute generatrix, a rotatable spindle carrying said grinding wheel, a spindle-holding member angularly movable about a main pivot axis normal to said generatrix and parallel to said work-table axis, and means for corelating the angular movement of said work-table and said spindle-holding member during the generation of one flank of a gear tooth, according to two relationships.

$$\alpha_{GEN}=[(1+\alpha_0/R_0)] \sin \beta_{GEN}-\beta_{GEN}$$

and $$\beta_{GEN}=\text{constant} \times \alpha_{GEN}$$

wherein $R_0$ is the base circle radius of said gear teeth, $a_0$ is the distance of a datum position of said main pivot axis from said base circle, —$\alpha_{GEN}$ is the angular movement of said work-table in generating one flank of one gear tooth, and +$\beta_{GEN}$ is the corresponding angular movement of said spindle-holding member, and during indexing, for withdrawing said main pivot axis to a distance of $R_0+a_0$ plus the radial height of a gear tooth, from said work-table axis, for rotating said spindle-holding member through an angle —$\beta_{GEN}$, and returning said main pivot axis to said datum position, whilst said work-table rotates to bring another tooth flank into generating relationship with said operative face of the grinding wheel.

References Cited in the file of this patent

UNITED STATES PATENTS

| | | |
|---|---|---|
| 2,883,800 | Reaser et al. | Apr. 28, 1959 |
| 2,888,784 | Cleff | June 2, 1959 |
| 2,926,463 | Statia | Mar. 1, 1960 |
| 2,930,163 | Barker et al. | Mar. 29, 1960 |